(No Model.) 2 Sheets—Sheet 1.

F. GROOS.
MACHINE FOR CLEANING AND PEELING VEGETABLES.

No. 479,562. Patented July 26, 1892.

Witnesses:
James F. Duhamel
Horace A. Dodge

FRED GROOS, Inventor,
by Dodge Sons
Attys.

(No Model.) 2 Sheets—Sheet 2.

F. GROOS.
MACHINE FOR CLEANING AND PEELING VEGETABLES.

No. 479,562. Patented July 26, 1892.

Witnesses:
James F. Duhamel
Horace A. Dodge.

FRED GROOS,
Inventor,
by Dodger Sons,
Attys.

UNITED STATES PATENT OFFICE.

FREDERIC GROOS, OF NAPLES, NEW YORK.

MACHINE FOR CLEANING AND PEELING VEGETABLES.

SPECIFICATION forming part of Letters Patent No. 479,562, dated July 26, 1892.

Application filed November 18, 1891. Serial No. 412,282. (No model.)

*To all whom it may concern:*

Be it known that I, FREDERIC GROOS, a citizen of the United States, residing at Naples, in the county of Ontario and State of New York, have invented certain new and useful Improvements in Machines for Cleaning and Peeling Vegetables, of which the following is a specification.

My invention relates to machines or devices for cleaning and peeling potatoes and other vegetables, fruits, &c.; and it consists in the combination, with a suitable receptacle, of a rotating frame or frames provided with polygonal, fluted, or irregular bars, which, acting upon the potatoes or other bodies, serve to rub off or remove the skin, while leaving the meat or substance intact and uninjured. In order to prevent injury to the vegetable or fruits, the bars which act upon them are made yielding, as hereinafter explained.

Figure 1:
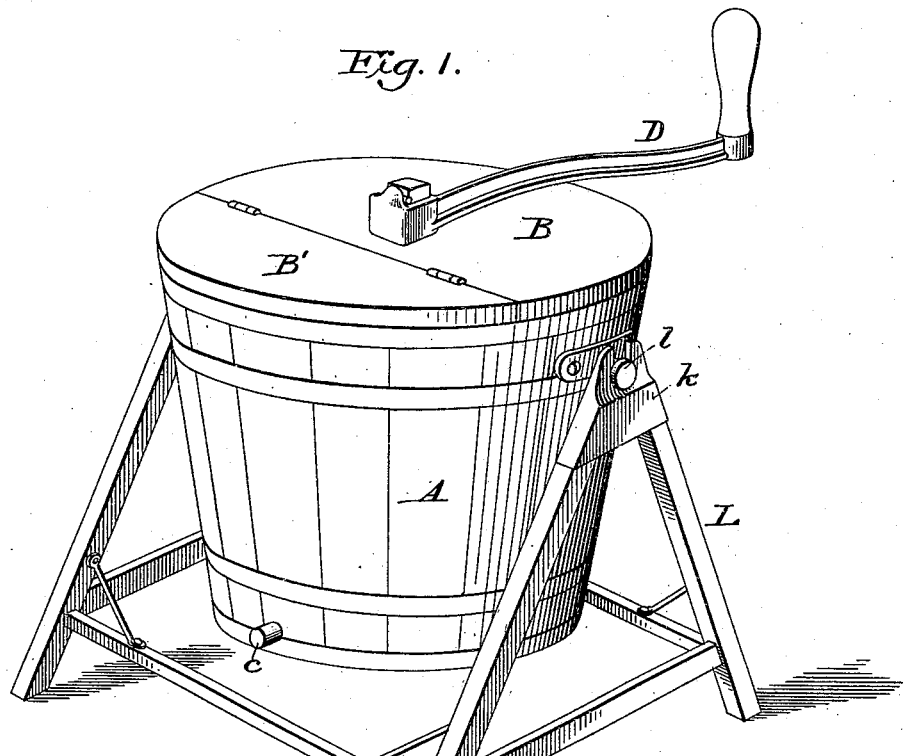
Figure 2:
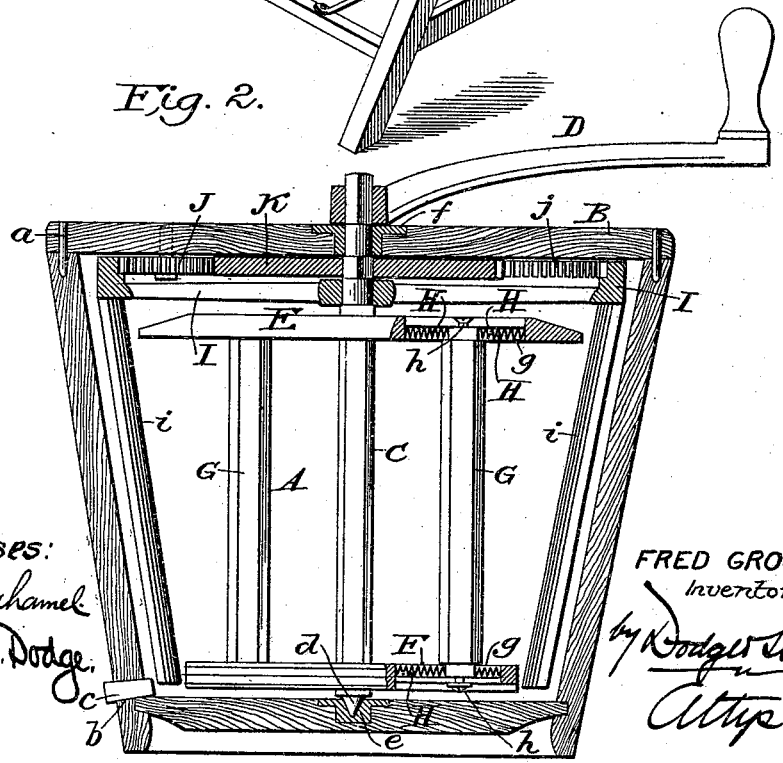
Figure 3:
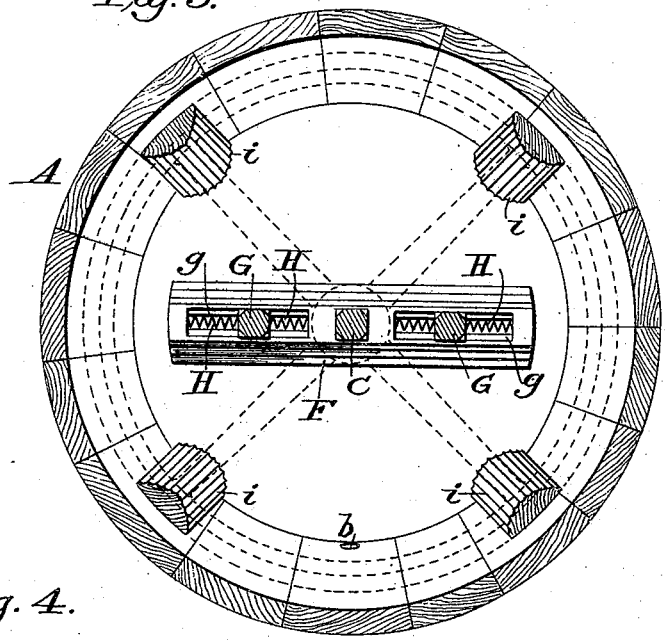
Figure 4:
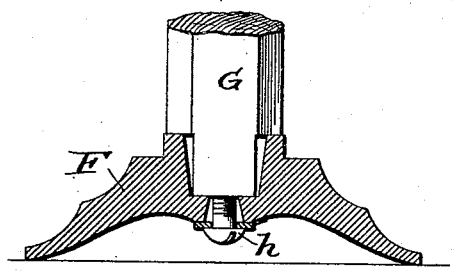

In the accompanying drawings, Figure 1 is a perspective view of my improved machine provided with a suitable framework or support, which may be used or omitted, as preferred; Fig. 2, a vertical section through the same, showing the internal construction; Fig. 3, a horizontal section on the line $x$ $x$ of Fig. 2; Fig. 4, a cross-section on the line $y$ $y$ of Fig. 2.

Various plans have heretofore been devised or suggested for removing the skin from potatoes and other vegetables, fruits, &c., the two plans most common being the paring or cutting of the skin by means of a blade or knife and the grating off of the skin by means of rough abrading-surfaces similar to that of a nutmeg-grater. Such prior plans are objectionable, in that they involve the loss of a material portion of the most valuable part of the potato or other vegetable, and for the further reason that the action, if not stopped at the proper moment, will ultimately destroy the entire vegetable.

My invention aims to produce a machine which shall rapidly and efficiently remove the skin or coating from vegetables, while avoiding the waste incident to the plans noted and without liability of continuing the action beyond the point of removing the skin, even though the acting parts of the machine be kept in motion. With this object in view I construct the machine as shown in the annexed drawings, in which—

A indicates a vessel, which may be conveniently made in the form of an ordinary bucket and made of wood or any material commonly used for such purposes. The bucket A is provided with a cover B, a portion of which B' is hinged so that it may be readily lifted to open the vessel for the introduction or removal of the vegetables to be treated and of water. The main body of the cover is preferably secured in place upon the vessel, though it may be simply held against movement thereon by steady-pins $a$, as indicated in Fig. 2.

It will be found advisable to provide the bucket or vessel A with an outlet $b$ at or near the line of its bottom, which may be closed by a plug or cork $c$, the opening serving to permit the escape of water and the particles of skin removed from the vegetables.

C indicates a vertical central shaft, which has its lower end formed with a point or pintle $d$, which enters a step or socket $e$ in the bottom of the vessel A, the upper end of the shaft being carried and guided in a collar $f$ in the cover B. The shaft C is furnished with a winch or crank D, by which it may be rotated, or in lieu of this any other convenient means of imparting rotation to said shaft may be adopted—as, for instance, a band-wheel to be driven by belt from any convenient motor.

Carried by the shaft C are two horizontal bars E and F, each provided with two slots or openings $g$, extending in the direction of the length of said bars. The upper bar E may conveniently be made of rectangular form in cross-section; but the lower bar F is advisably made in the form represented in Fig. 4—that is to say, wider at its lower than at its upper side and longitudinally fluted or ribbed, as shown, for a purpose hereinafter explained.

Extending vertically between the bars E and F are polygonal rubbing-bars G, of which there may be more or less, according to the size of the machine and the character of the vegetables to be operated upon, though in practice I prefer to use one at either side of the central shafts C, as shown in Figs. 2 and 3. The ends of the bars G are reduced to fit within the slots $g$, in which they are designed to have lateral play, the freedom of their movement being determined by screws $h$, passing through a reduced portion of the slot and serving to produce greater or less friction upon the bars E and F.

H H indicate coiled springs placed within the slots $g$ on opposite sides of each end of the bars G and serving to hold said bars normally in a medial position in their slots, but yielding to slight pressure to permit the bars to shift laterally, and thereby permit the passage between them of potatoes or other vegetables of varying size or of a size too large to pass otherwise.

I indicates a circular frame or spider provided with depending arms $i$, which are longitudinally fluted, ribbed, or grooved in a manner analogous to the bar F, as indicated in Fig. 3. The spider is further formed or furnished with an internally-toothed annular gear-ring $j$, Fig. 2, which receives motion through an idler J from a gear-wheel K, carried by the shaft C. The pinion J is mounted upon a stud or axle made fast to the cover B, and serves simply as a means of reversing the motion of gear-wheel K, and thereby causing the gear-ring $j$ to rotate in reverse direction from the frame E F G.

In practice it is desirable to mount the vessel A in a frame or support, which may be conveniently made in the form represented in Fig. 1, in which L indicates the frame, provided at its top with notched metal caps $k$ to receive the headed or grooved hanger-studs $l$, which are made fast to the sides of the vessel A and dropped into the notched caps $k$, the heads of the hanger-studs preventing the spreading of the frame, which will of course be suitably braced to further stiffen it and guard against spreading or racking.

It will be seen that the precise arrangement of gearing described is not essential and that any common form of gearing adapted to rotate the two parts in opposite directions may be adopted, such double gearing being common and well known and extensively used in ice-cream freezers, egg-beaters, and the like. So, too, measurably good results may be secured by simply attaching the bars $i$ to the inner surface of the vessel A and rotating only the inner frame E F G, though far better results are obtained by causing both parts to move.

By the arrangement of gearing described and represented in the drawings the mechanism is placed wholly within the vessel A and where it can neither do harm to nor be injured by meddlesome persons or otherwise.

The machine being thus constructed is filled or partially filled with the potatoes or other vegetables to be washed and peeled, and a suitable quantity of water is poured in with them, preferably enough to cover the contents of the vessel. Motion is then imparted to the shaft C, and the bars G and $i$ in passing each other act by their grooved, channeled, ribbed, or angular faces to rub off the skin of the potato or vegetable in the vessel, the reverse movements of the bars G and $i$ producing a very efficient action in this respect, and serving also to turn the vegetable and present different faces to the action of the apparatus. At the same time the bar F, by reason of its inclined upper faces, serves to pass beneath and to elevate the potatoes or other vegetables and to rub off or to remove the skins of such portions as it comes in contact with, and the action of the several bars is aided by the rubbing together and consequent abrasion of the potatoes or other vegetables themselves. This contact and the entrance of the smaller vegetables or projecting portions of such vegetables into the eyes, cavities, or depressions of the other vegetables serves to effectually remove the skin of such depressed portions. The bars $i$ travel around within the vessel A, and carrying before them the vegetables to be peeled move them against the bars G, forcing back the latter sufficiently to permit the passage of the vegetables between them and the bars $i$, and in like manner the vegetables which enter between the shaft C and the bars G force the bars outward, and are thereby enabled to pass through the intervening space. This yielding action of the bars enables them to accommodate themselves to vegetables of irregular size and form and causes their edges or working faces to act in a most efficient manner upon the vegetables within the vessel. The vessel A being preferably of tapering form, smaller at the bottom than at the top, and the bars $i$ being placed parallel with the sides of the vessel, or substantially so, there is a tendency of the vegetables to wedge or force their way downward between the bars $i$ and the bars G, for which reason the lifting action of the horizontal bar F is peculiarly important.

Having thus described my invention, what I claim is—

1. The herein-described machine, consisting of a containing-vessel, a shaft mounted within said vessel and provided with polygonal bars, a frame or spider also mounted within the vessel and provided with polygonal bars, and gearings, substantially such as described and shown, for causing the two sets of bars to travel about the shaft simultaneously in opposite directions.

2. In a vegetable-peeling machine, the combination of a containing-vessel, polygonal bars located near the walls of said vessel, a rotary shaft, and polygonal bars carried by said shaft and adapted to move past the polygonal bars placed near the walls of the vessel.

3. In combination with a vessel provided near its walls or surface with polygonal bars or ribs, a rotary frame and yielding polygonal bars carried by said frame and adapted to move past the polygonal bars placed near the walls or surface of the vessel.

4. In combination with vessel A and with grooved, fluted, or polygonal bars $i$, shaft C, provided with slotted bars E and F, polygonal bars G, extending between the bars E and F, and springs g, bearing against the bars G and affording a yielding support therefor.

5. In combination with vessel A, shaft C, and slotted bars E F, polygonal bars G, extending between the bars E F, and clamping-screws h, serving to hold the bars G with any required degree of friction.

6. In combination with vessel A and shaft C, horizontal bars E F, and polygonal bars G, the bar F having its upper face beveled or inclined to pass beneath and lift the vegetables within the vessel.

7. The herein-described machine for washing and peeling vegetables, consisting of vessel A, provided with cover B, shaft C, located centrally within said vessel, bars E F, carried by shaft C, polygonal bars G, extending between the bars E F, spider I, loosely mounted upon shaft C and provided with bars i and annular gear-ring j, pinion J, and gear-wheel K for imparting motion to the spider and the bars i, all susbtantially as set forth.

8. In a machine for peeling vegetables, the combination, with a containing-vessel, of a rotary frame within the vessel and yielding polygonal bars carried by said frame and adapted to act upon and remove the skin from the vegetables.

In witness whereof I hereunto set my hand in the presence of two witnesses.

FRED. GROOS.

Witnesses:
C. S. DRURY,
WILLIAM W. DODGE.